Dec. 28, 1965   F. UNGERER   3,225,992
APPARATUS FOR GUIDING ELONGATED MEMBERS
Filed Oct. 7, 1963   2 Sheets-Sheet 1
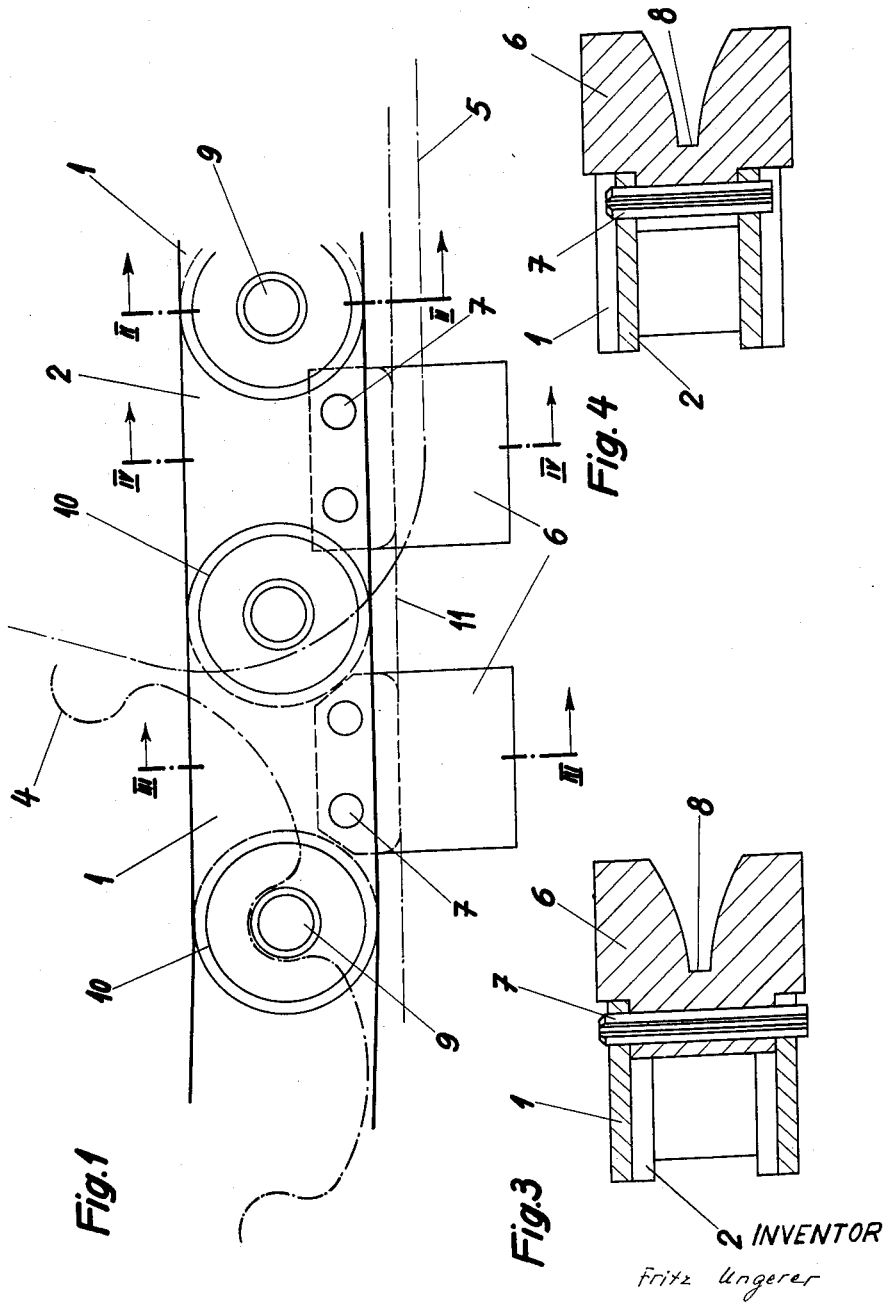
INVENTOR
Fritz Ungerer
by Michael S. Striker

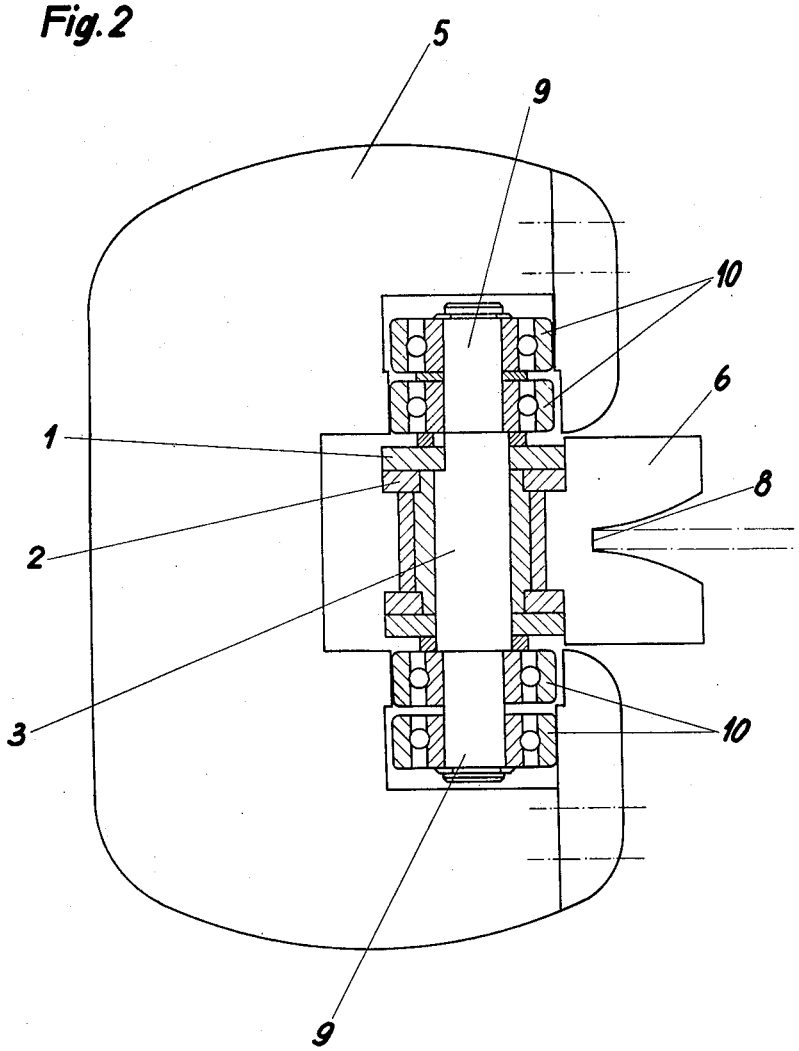

United States Patent Office 3,225,992
Patented Dec. 28, 1965

3,225,992
APPARATUS FOR GUIDING ELONGATED MEMBERS
Fritz Ungerer, Arlingerstrasse 6, Pforzheim, Germany
Filed Oct. 7, 1963, Ser. No. 314,309
Claims priority, application Germany, Oct. 15, 1962, U 9,326
7 Claims. (Cl. 226—170)

This invention relates to apparatus for guiding an elongated member, such as metal strip, more particularly to apparatus of the type described and claimed in the U.S. Patent No. 2,857,158. Such apparatus comprises endless bands which extend along the sides of and move in unison with the metal strip and pass around wheels, which may be driven, if desired.

In the apparatus described in the U.S. Patent No. 2,857,158, the bands comprise chains, which are guided on or in supports between the sprocket wheels and each link of which carries a hardened socket member, which is open toward the edge of the metal strip. In the previous practice, these socket members were either made integral with the chain links or welded to the same.

According to the present invention, the socket members are detachably mounted on the chain links of the bands moving in unison with the strip. This enables the hardening of the socket members to be carried out independently of the chain links and eliminates the adverse effect of a welding operation on the hardness of the socket members. As a result, the socket members can be formed to fit the metal strip exactly without need for machining them after welding. Finally, any socket member which has been damaged in operation can easily be replaced without need for replacing the entire chain link.

The chain links of the bands which move in unison with the metal strip may consist in alternation of outer and inner side plates and may be pivotally connected, and the base portion of the socket member may be inserted between these side plates and secured with expanding pins, the pivot pins for connecting the side plates having at both ends protruding end portions, which are provided with ball bearings for guiding the chain between the sprocket wheels.

An embodiment of the invention is shown by way of example on the accompanying drawing.

FIG. 1 is a side elevation showing a portion of a chain and in dash-and-dot lines a sprocket wheel and a chain guide.

FIG. 2 is a sectional view taken through the chain guide at a pivot of the side plates of the chain.

FIGS. 3 and 4 are two sectional views taken through the side plates of the chain and showing the detachably mounted socket members.

The chain links comprise in alternation outer and inner side plates 1 and 2 and are pivoted by pins 3. The chains run around opposed sprocket wheels 4, one of which is indicated with dash-and-dot lines in FIG. 1. As is disclosed in the U.S. Patent No. 2,857,158, supports 5 for guiding the chains are provided between these sprocket wheels. One of these supports is also indicated with dash-and-dot lines in FIG. 1.

According to the present invention, the base portions of the socket members 6 are inserted between the outer or inner side plates 1 and 2 arranged in alternation and are detachably secured with expanding pins 7. Socket members 6 having wider or narrower base portions are arranged in alternation, as is shown in FIGS. 3 and 4. The socket members have flared arcuate slot-defining edges and the width of the slot at its bottom 8 is such that even a strip formed with waves will not be pinched. The pivot pins 3 have protruding end portions 9, which carry ball bearings 10 guided by the supports 5, as is shown in FIG. 2. Alternate ball bearings 10 engage the support on opposite sides. The line along which the edge of the metal strip is guided is indicated with a dash-and-dot line at 11 in FIG. 1.

I claim:
1. For use in an apparatus for moving and guiding elongated members such as elongated sheet metal bands or the like, in combination, a chain including a plurality of links each comprising a pair of spaced, elongated, substantially parallel plates, the ends of the plates of one link overlapping the ends of the plates of the link adjacent thereto, and pivot pins pivotally connecting the overlapping ends of adjacent links; a hardened socket member for each link and each socket member having an attaching portion extending between the plates of the respective link and a guide portion projecting to one side beyond said plates and being formed with an elongated open-ended slot extending substantially parallel to said plates and adapted to engage an edge portion of the elongated member to be guided; and connecting means for releasably connecting each socket member in a fixed position directly to the plates of the respective link.

2. For use in an apparatus for moving and guiding elongated members such as elongated sheet metal bands or the like, in combination, a chain including a plurality of links each comprising a pair of spaced, elongated, substantially parallel plates, the ends of the plates of one link overlapping the ends of the plates of the link adjacent thereto, and pivot pins pivotally connecting the overlapping ends of adjacent links; a hardened socket member for each link and each having an attaching portion extending between the plates of the respective link and a guide portion projecting to one side beyond said plates and being formed with an elongated open-ended slot extending substantially parallel to said plates and adapted to engage an edge portion of the elongated member to be guided; and connecting means for releasably connecting each socket member in a fixed position directly to the plates of the respective link, said connecting means being constituted by a pair of expandable pins extending through aligned bores in the attaching portion of each socket member and the respective plates.

3. For use in an apparatus for moving and guiding elongated members such as elongated sheet metal bands or the like, in combination, a chain including a plurality of links each comprising a pair of spaced, elongated, substantially parallel plates, the ends of the plates of one link overlapping the ends of the plates of the link adjacent thereto, and pivot pins pivotally connecting the overlapping ends of adjacent links, each pivot pin extending with opposite end portions thereof beyond the respective plates; roller means mounted on the opposite end portions of each pivot pin for rotation with respect thereto; a hardened socket member for each link and each having an attaching portion extending between the plates of the respective link and a guide portion projecting to one side beyond said plates and being formed with an elongated open-ended slot extending substantially parallel to said plates and adapted to engage an edge portion of the elongated member to be guided; and connecting means for releasably connecting each socket member in a fixed position directly to the plates of the respective link.

4. An apparatus for moving and guiding elongated members such as sheet metal bands or the like along a predetermined path comprising, in combination, sprocket means; a chain carried by said sprocket means and having a portion extending along said path, said chain including a plurality of links each having a pair of spaced, elongated, substantially parallel plates, the ends of the plates of one link overlapping the ends of the plates of the link adjacent thereto, pivot pins pivotally connecting the overlapping ends of adjacent links and each projecting with opposite end portions thereof beyond the overlapping ends of the plates forming said links, a hardened socket member for each link removably fixed thereto and formed with an open-ended slot extending in longitudinal direction of said chain, and a pair of roller means mounted adjacent each other on each of said opposite end portions of each pivot pin; and guide means extending along said path and having elongated guide portions respectively engaging one of the roller means on one end portion of each pivot pin only on one side of its peripheral surface and the other roller means on said one end portion of each pivot pin only on one side of its peripheral surface which is diametrically opposite to the engaged side of said one roller means.

5. An aparatus as set forth in claim 4, wherein said roller means are constituted by anti-friction bearings.

6. An apparatus as set forth in claim 4, wherein each of said socket members has an attaching portion located between the plates of the respective link and wherein each of said socket members is removably connected to said plates by connecting means consittuted by expandable pins respectively extending through aligned bores through said attaching portion and the respective plates.

7. An apparatus as set forth in claim 4, wherein said guide means includes a member of substantially U-shaped cross section having a pair of legs each formed with a slot arranged to provide passage for said roller means on opposite ends of each pivot pin, each slot has opposite faces each of which is staggered and having one face portion closer to the axis of said roller means than the other face portion, and said closer face portions defining said guide portions.

References Cited by the Examiner
UNITED STATES PATENTS

| | | | |
|---|---|---|---|
| 2,103,680 | 12/1937 | Klaucke | 198—189 |
| 2,857,158 | 10/1958 | Ungerer | 226—172 |
| 3,056,536 | 10/1962 | Baugh | 226—172 |
| 3,143,269 | 8/1964 | Van Eldik | 226—172 |

M. HENSON WOOD, JR., *Primary Examiner.*

ROBERT B. REEVES, *Examiner.*